United States Patent Office 2,822,181
Patented Feb. 4, 1958

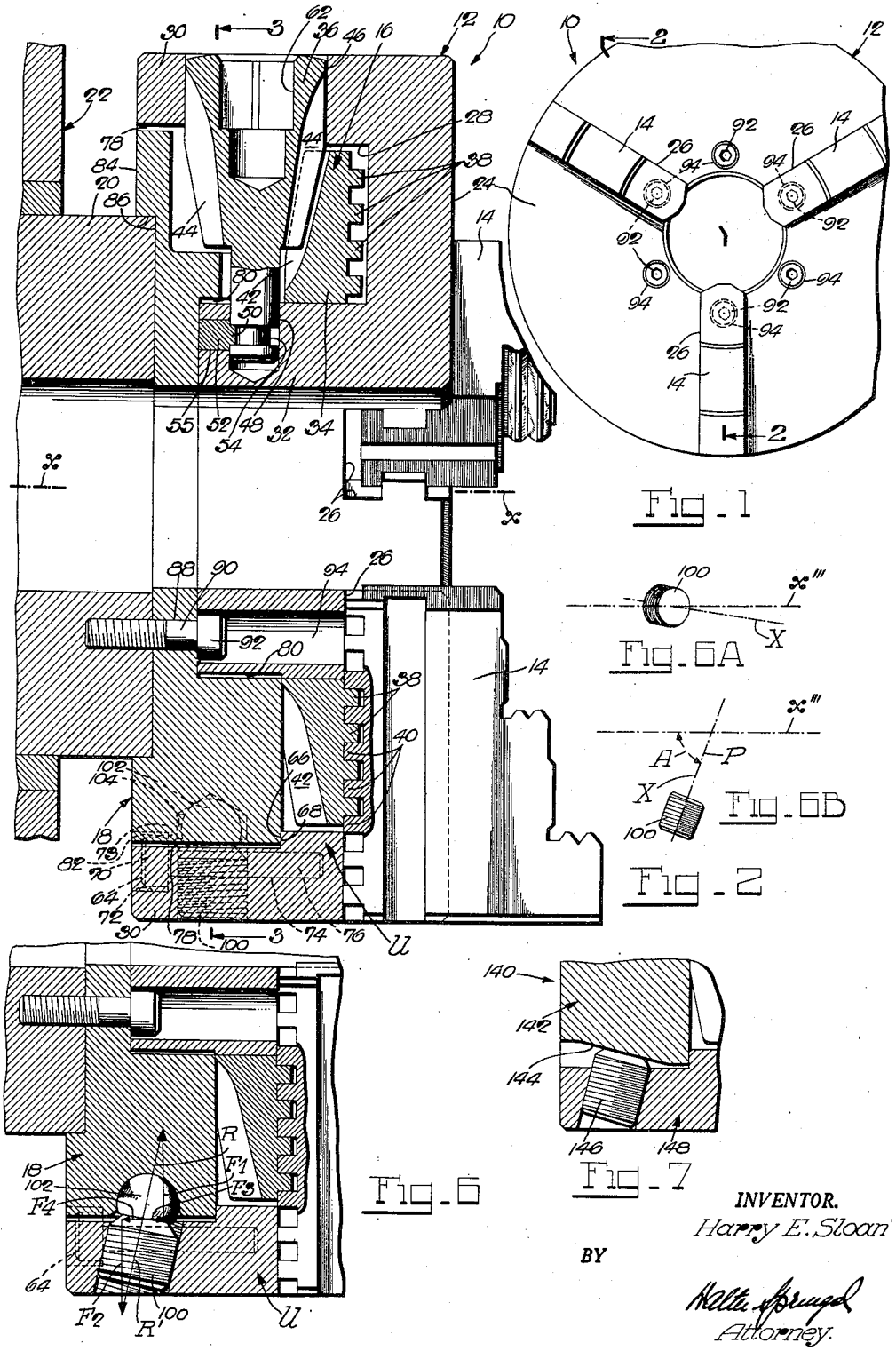

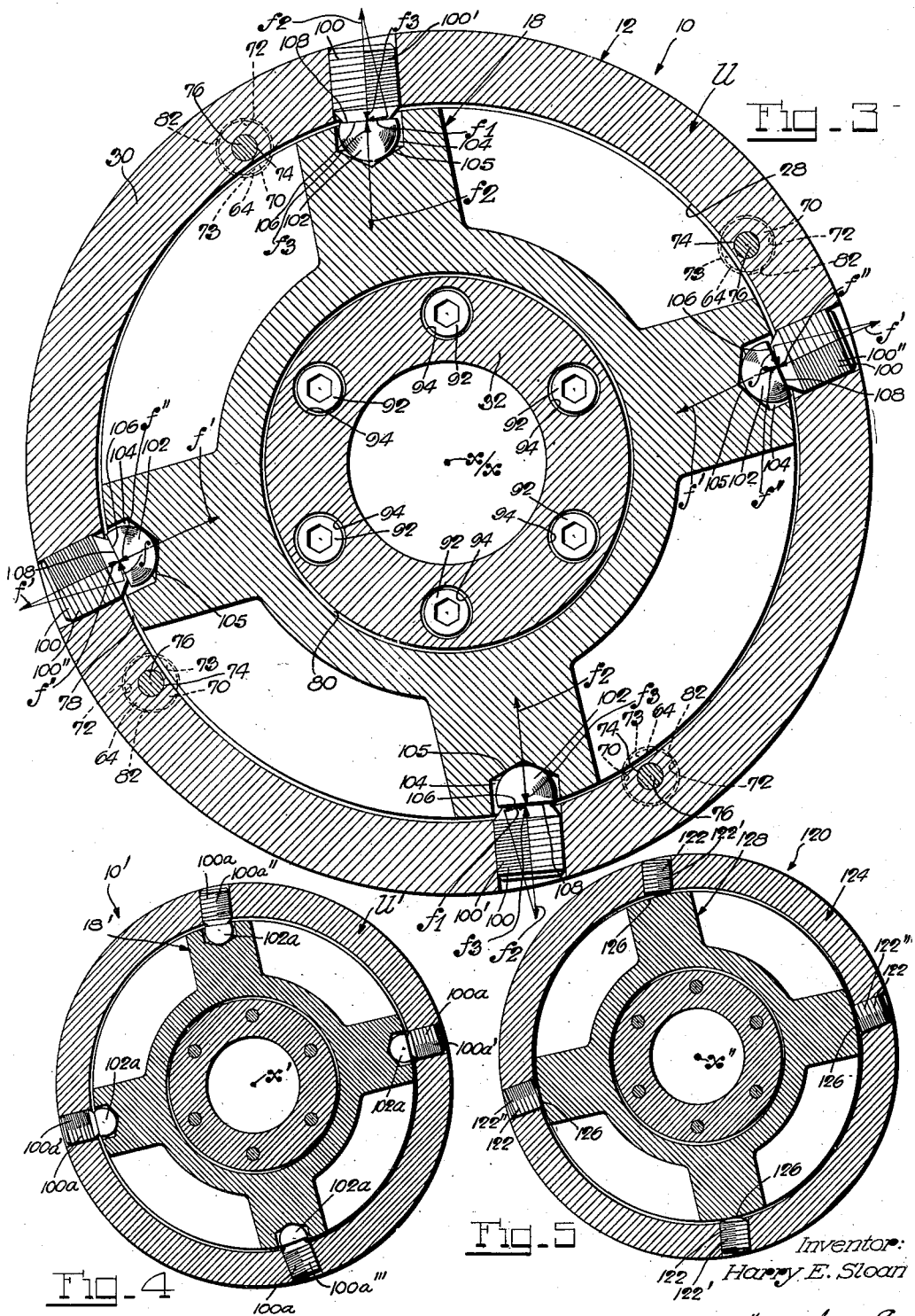

2,822,181

CENTER-ADJUSTABLE UNIVERSAL CHUCK WITH AUTOMATIC TORSION LOCK

Harry E. Sloan, Hartford, Conn., assignor to The Cushman Chuck Company, Hartford, Conn., a corporation of Connecticut Application August 30, 1955, Serial No. 531,457

9 Claims. (Cl. 279—114)

This invention relates to chucks in general, and to universal chucks of the center-adjustable type in particular.

Universal chucks of this type are characterized by a chuck aggregate which customarily comprises a chuck body with movable work-gripping jaws thereon and scroll-type jaw-operating means therein, and a mounting adapter which is fixedly mounted on a support, such as the power spindle of a lathe or other machine tool, for instance, and on which the chuck aggregate is in turn mounted for center-adjustment thereon. Customarily, the chuck aggregate and mounting adapter, conveniently referred to hereinafter as "chuck unit" and "adapter unit," are held in their assembled relation by holding screws which exert a clamping force on abutting surfaces of these units and have such relative clearance from the latter as to permit relative sliding of these surfaces on each other for center-adjustment of the chuck unit on the adapter unit. Center-adjustment of the chuck unit on the adapter unit is customarily achieved by turning readily accessible radial set screws which are received in one unit and bear against a customarily cylindrical surface of the other unit. Due to the limited surface engagement areas at a few widely spaced places between these set screws and the associated unit, the former offer little resistance to torsional operating stresses in the chuck unit, and in any event offer insufficient resistance effectively to counteract the turning tendencies of the chuck unit under high torsional operating stresses induced therein by certain operations on work held thereby even if these set screws are prohibitively tightened. Hence, the aforementioned clamping force exerted by the holding screws on the units is customarily relied on to transmit most, if not all, operating stresses, including torsional stresses, from the chuck unit to the adapter unit. While the clamping force exerted by the holding screws on the units is sufficient to transmit most ordinary operational stresses from the chuck unit to the adapter unit, this clamping force is not only poorly suited to transmit torsional stresses in any event because of its unfavorable component with which to counteract relative turning tendencies between the units under such stress, but is clearly inadequate to transmit from the chuck unit to the adapter unit even moderately high torsional operating stresses without permitting relative rotary slippage between the units. Such relative slippage between the units under relatively high torsional stresses in the chuck unit not only entails rapid wear of the aforementioned set screws and cooperating cylindrical surface of the associated unit and, consequently, early deterioration of the desired micrometer-like response of the chuck unit to rotation of the set screws for center-adjustment of the former on the adapter unit, but in many instances destroys the very center-adjustment of the chuck unit, or work therein, for which the set screws have been set.

It is the primary aim and object of the present invention to have provisions in a universal chuck of this type for reliably transmitting even exceptionally high torsional stresses from the chuck unit to the adapter unit, thereby to eliminate in any event relative rotary slippage between the units under external torsion-inducing forces and, hence, obviate the aforementioned serious disadvantages ensuing therefrom.

It is another object of the present invention to have the aforementioned torsional stress transmitting provisions in a universal chuck of this type perform without any participation either from the clamping force between the units exerted by the customary holding screws, or from the adjustment-holding force of the customary set screws, thereby to permit tightening of the holding screws and set screws to the mere extent required for the satisfactory performance of their respective units-clamping and adjustment-holding functions, even when the holding screws are to exert no greater clamping force on the units than is required for holding the latter in their axially assembled relation so that these holding screws need not be loosened for a center-adjustment of the chuck unit on the adapter unit on manipulating the set screws without undue effort.

It is a further object of the present invention to embody the aforementioned torsional stress transmitting provisions in a universal chuck of this type by the sole use of entirely conventional parts of the latter and without the addition of any special part or parts, on slightly changing the conventional operative relation between these conventional parts, thereby to provide a chuck with this special and highly advantageous torsional stress transmitting feature at no cost, or at the most at insignificant cost over and above that of a conventional chuck without this special feature.

Another object of the present invention is to embody the aforementioned torsional stress transmitting provisions in a universal chuck of this type by the sole use of one or more of the customary set screws for the adjustment of the chuck unit on the adapter unit, by disposing one or more of these sets screws relative to the assembled units so that the former cooperate with the unit engaged thereby wedge-like to lock the units against relative rotation on the slightest, as well as the most forceful, relative rotational tendencies between the units.

It is a further object of the present invention to dispose one or more of the customary set screws relative to the assembled units of a universal chuck of this type so that these set screws cooperate with the unit engaged thereby not only wedge-like to lock the units against relative rotation on relative rotational tendencies between them, as aforementioned, but also to augment, on arrest by the set screws of the adjusted chuck unit against further movement on the adapter unit, the axial clamping force exerted by the holding screws on the units sufficiently so that the over-all clamping force between these units is for normal operation of the chuck assuredly adequate to transmit all operational stresses in the chuck unit, save relatively high torsional stresses, directly to the adapter unit, thereby to permit tightening of the holding screws to such an extent only that they need not be loosened for a center-adjustment of the chuck unit on manipulation of the set screws without undue, effort, yet obtain between the units an over-all axial clamping force which compares favorably with that obtained on re-tightening the holding screws after loosening the same for a center-adjustment of the chuck unit in order to permit such adjustment of the latter in the first place.

Other objects and advantages will appear to those skilled in the art from the following, considered in conjunction with the accompanying drawings.

In the accompanying drawings, in which certain modes of carrying out the present invention are shown for illustrative purposes:

Fig. 1 is a fragmentary front view of a universal chuck embodying the present invention;

Fig. 2 is an enlarged section through the chuck, taken substantially on the line 2—2 of Fig. 1;

Fig. 3 is another section through the chuck, taken substantially on the line 3—3 of Fig. 2;

Fig. 4 is a reduced cross section through a universal chuck embodying the present invention in a modified manner;

Fig. 5 is a reduced cross section through a universal chuck embodying the present invention in another modified manner;

Fig. 6 is a fragmentary longitudinal section through a universal chuck embodying the present invention in a further modified manner;

Figs. 6A and 6B are diagrammatic views illustrating the relative axial disposition of certain prominent elements of the modified chuck of Fig. 6; and Fig. 7 is a fragmentary longitudinal section through a universal chuck embodying the present invention in still another modified manner.

Referring to the drawings, and more particularly to Figs. 1 to 3 thereof, the reference numeral 10 designates a universal chuck of the center-adjustable type, comprising a body 12 with work-gripping jaws 14 and jaw-operating mechanism 16, and an adapter disc 18 by means of which the chuck body with its parts 14 and 16 is adjustably mounted on the power spindle 20 of a lathe or other machine tool 22 (Fig. 2).

The chuck body 12, being of usual cylindrical form, is in its front face 24 provided with equiangularly spaced radial guideways 26 for the jaws 14, and is in its rear provided with a ring-shaped recess 28, leaving the chuck body with a rearwardly extending peripheral skirt 30 and a central hub 32, both arranged concentrically with respect to the longitudinal chuck axis x—x.

The jaw-operating mechanism comprises, in the present instance, a conventional scroll disc 34 and a pinion 36 of which the former is received in the rear recess 28 in the chuck body 12 and journalled on the central hub 32 thereof. The disc 34 is at its front provided with scroll-like ribs or teeth 38 which mesh with similarly formed teeth 40 in back of the jaws 14 and move the latter toward and away from the chuck center x—x on rotation of the disc 34 in opposite directions, as will be readily understood. The disc 34 is at its rear, provided with bevel teeth 42 that are in mesh with similar teeth 44 of the pinion 36, which is journalled at 46 and 48 in the skirt 30 and hub 32, respectively, of the chuck body 12. In order to hold the pinion 36 against axial escape from the chuck body 12, the key end 50 of a retainer pin 52 projects into a peripheral groove 54 in the pinion 36. The retainer pin 52 is received, preferably with a sliding fit, in a bore 55 in the end of the central hub 32 of the chuck body 12. As usual, the pinion 36 is located within the peripheral confines of the chuck body 12 (Fig. 2), and is provided with a socket 62 for the reception of a suitable tool, such as an Allen wrench, for instance, with which to turn the pinion and, hence, the scroll disc 34, for operating the jaws 14.

In the present exemplary chuck 10, the adapter disc 18, by means of which the chuck is adjustably mounted on the power spindle 20 of a lathe as already mentioned, forms also a separate but complementary part of the chuck body 12 in that it serves also as a retainer for the scroll disc 34 to keep it in cooperative relation with the jaws 14. To this end, the chuck body 12 is directly mounted on the adapter disc 18 for universal adjustment thereon within limits in a plane normal to the chuck axis x—x. This is achieved by mounting the chuck body 12 on the adapter disc 18 by means of a plurality of screws 64, for instance, which are threadedly received in the end of the skirt 30 of the chuck body 12, while their heads 70 are received in complementary parts of annular recesses 72 in the body skirt 30 and adapter disc 18 and seated on the complementary bottom parts of these recesses, or at least on the bottoms 73 of the recess parts formed in the adapter disc, so as to hold the front face 66 of the latter on an annular shoulder 68 in the body skirt 30 in clamping engagement therewith, yet with only such force as to permit forced adjustment of the chuck body 12 on the adapter disc 18 in a manner to be described. To this end, the drilled holes 74 in the body skirt 30 which are subsequently tapped for the reception of the threaded shanks 76 of the screws 64, may be counterbored to provide the recesses 72 for the screw heads 70 when the adapter disc 18 is with its front face 66 seated fully, or nearly so, on the annular shoulder 68 in the body skirt 30. Universal adjustment of the chuck body 12 with its jaws 14 and jaw-operating mechanism 16 as a unit U on the adapter disc 18, on the relatively slidable surfaces 66 and 68 of the disc 18 and body skirt 30, on the one hand and the bottoms 73 of the parts of the recesses 72 in the disc 18 and the parts of the screw heads 70 seated thereon, on the other hand, is limited by the clearances 78 and 80 between the chuck body 12 and adapter disc 18 and by the clearances 82 between the recesses 72 and the screw heads 70 received therein (Fig. 2).

The adapter disc 18 has also suitable provisions for its rearward attachment to the power spindle 20 of the lathe or other machine tool 22. In the present example, the rear face 84 of the adapter disc 18 is provided with an annular recess 86 for the fitted reception of the front end of the power spindle 20, thus accurately locating the adapter disc on the power spindle. Further, the adapter disc 18 is provided with a plurality of holes 88 for the reception of mounting screws 90 which are threadedly received in the power spindle 20. The heads 92 of the mounting screws 90 project into through-holes 94 in the chuck body 12 through which they are accessible from the front of the chuck. The holes 94 in the chuck body 12 are sufficiently large to admit a suitable wrench to the screw heads 92 in any adjusted position of the chuck unit U on the adapter disc 18, as well as to provide sufficient clearance from these screw heads to permit universal adjustment of the chuck unit U on the adapter disc 18 within the aforementioned limits.

Received in the rear skirt 30 of the chuck body 12 are a plurality, in this instance four, equiangularly spaced set screws 100 which on being turned in appropriate directions react with the adapter disc 18 in adjusting the chuck unit U on the latter into any one of an infinite number of positions thereon within the limits imposed by the aforementioned clearances between the chuck unit and adapter disc. In the present example, the set screws 100 do not react directly with the adapter disc 18, but rather through intermediation of ball-type links 102 in the manner shown and described in my copending application Serial No. 518,013, filed June 27, 1955. Thus, equiangularly spaced sockets 104 of a number equal to that of the set screws 100 are machined into the periphery of the adapter disc 18, and the ball-type links 102, hereafter referred to simply as "balls," are seated and turnable in these sockets. Conveniently, each socket 104 is simply and conveniently formed by a machined bore on the conical bottom 105 of which the associated ball 102 is seated and turnable. Significantly, each of the balls 102 has a cutaway surface 106 which is preferably a machined flat, while the adjacent end surface 108 of the associated set screw 100 is similarly flat and preferably accurately machined in order uniformly to engage the flat surface 106 on the adjacent ball 102 throughout its area in the fashion shown in Fig. 3.

Whenever for any reason whatever, such as wear of any one or more of the parts of the instant chuck, it becomes necessary to re-center the chuck on the power spindle 20 by adjusting the chuck unit U on the adapter disc 18 through manipulation of the set screws 100, as described, the flat end surfaces 108 of the latter will remain in full contact with the flats 106 on the associated balls 102 throughout the adjustment as well as thereafter. This is due to the fact that the balls 102, being free to turn in their respective sockets 104 and also slide with their flats 106 on the flat end surfaces 108 of the adjacent set screws 100, will readily adjust themselves to any position of the chuck unit on the adapter disc within the prescribed limits without losing full contact of their flats with the flat end surfaces of the adjacent set screws. This holds true even when adjustment of the chuck unit U on the adapter disc is accompanied by a slight rotational component motion of the chuck unit, as is the case in most adjustments. In thus achieving unfailing and full surface-to-surface contact between the balls 102 and set screws 100 during any adjustment of the chuck unit U on the adapter disc 18 as well as in any adjusted position of the former on the latter, it stands to reason that the flats 106 on the balls and the flat end surfaces 108 of the set screws are subjected to hardly any wear for a long period of time which may well extend to the life of the chuck. Furthermore, even if the flats 106 of the balls 102 and the flat end surfaces 108 of the set screws 100 should show some slight wear due to their sliding on each other in consequence of numerous adjustments of the chuck unit on the adapter disc, such wear would be substantially uniform throughout their areas and, hence, not in the least detrimental to further accurate adjustments of the chuck unit and the ability of the balls and set screws safely and reliably to transmit for an indefinite length of time such operational stresses from the chuck unit to the adapter disc which are not directly transmitted by virtue of their clamping engagement with each other by the force of the holding screws 64.

The exemplary chuck described so far is in all major respects like or similar to one form of chuck shown and described in my aforementioned copending application Serial No. 518,013 and, hence, forms no part of the present invention.

The present invention deals with a unique feature according to which the set screws 100 are so arranged, in sets, that they cooperate with their associated balls 102 in locking or wedging the chuck unit U and the adapter disc or "unit" 18 to each other against relative rotation in opposite directions, respectively, on relative rotational tendencies between these units. To this end, the set screws 100 in the instant exemplary chuck are disposed so that their axes extend on different sides, respectively, of the chuck axis $x$—$x$ (Fig. 3). The set screws 100 are, furthermore, arranged in sets of which those of each set act in concert with each other to oppose relative rotation between the units U and 18. Thus, the set screws 100' constitute one set which cooperate with their associated balls 102 to lock the units U and 18 to each other against relative rotation on counterclockwise rotational tendencies of the chuck unit U relative to the adapter unit 18 or clockwise rotational tendencies of the adapter unit 18 relative to the chuck unit U (Fig. 3). Conversely, the set screws 100" constitute the other set which cooperate with their associated balls 102 to lock the units U and 18 to each other against relative rotation on clockwise rotational tendencies of the chuck unit U relative to the adapter unit 18 or on counterclockwise rotational tendencies of the adapter unit 18 relative to the chuck unit U (Fig. 3). Suppose that the chuck unit U, by virtue of torsional stresses therein induced by a certain operation on gripped work thereon, tends to turn clockwise relative to the adapter unit 18 (Fig. 3) with an over-all force of a certain magnitude, the two set screws 100" and their associated balls 102 will act in concert to counteract this force, each set screw and associated ball counteracting one-half of the magnitude of this force, as constituted by the vectors $f$. To lock the units U and 18 to each other against clockwise rotation of the chuck unit relative to the adapter unit under these circumstances, the forces, constituted by the vectors $f'$, then acting on the set screws 100" and their associated balls 102 in consequence of their subjection to the turning force of the chuck unit, must be opposed by forces whose vectors $f''$ are identical but opposed to each other (Fig. 3). In the present instance, the forces, constituted by the vectors $f''$, with which the set screws 100" and their associated balls are wedged against each other are considerably larger than the turning forces of the chuck unit as constituted by the vectors $f$, this being due to the preferential arrangement of these set screws so that they do not deviate overly much from radial disposition with respect to the chuck axis $x$—$x$. In arranging these set screws so that they do not deviate overly much from such radial disposition, the chuck unit U will respond for its center-adjustment on the adapter unit 18 to rotation of these set screws in near optimum fashion. Of course, while near radial disposition of the set screws 100" is advantageous for the foregoing reason, the deviation of these set screws from radial disposition must nevertheless be such that their wedging forces as represented by the vectors $f''$ will, even under exceptionally high torsional stresses in the chuck unit, never reach a magnitude at which these set screws would be stripped from their tapped holes in the chuck unit, or the cylindrical skirt 30 of the latter would crack.

Coming back to the above-described exemplary tendency of the chuck unit U to turn clockwise (Fig. 3) relative to the adapted unit 18, it follows from the preceding that the set screws 100" and their associated balls 102 act in concert fully to counteract this relative turning tendency of the chuck unit in reliable wedge fashion regardless of the magnitude of the force which tends to turn the chuck unit clockwise relative to the adapter unit. Conversely, the set screws 100" and their associated balls 102 fully counteract in the same fashion any tendencies of the adapter unit 18 to turn counterclockwise (Fig. 3) relative to the chuck unit U, as will be readily understood.

The set screws 100' of the other set and their associated balls 102 will, as already mentioned, cooperate to lock the units U and 18 to each other against relative rotation on counterclockwise rotational tendencies of the chuck unit U relative to the adapter unit 18 (Fig. 3) or on clockwise rotational tendencies of the adapter unit 18 relative to the chuck unit U. Suppose that the chuck unit U, by virtue of torsional stresses therein induced by a certain machining operation on gripped work thereon, for instance, tends to turn counterclockwise (Fig. 3) relative to the adapter unit 18, the turning forces of the chuck unit to be counteracted by the set screws 100' and their associated balls 102, and represented by the vectors $f1$ (Fig. 3), have components, represented by the vectors $f2$, which act on these set screws and their associated balls. To lock the units U and 18 to each other against counterclockwise rotation of the chuck unit relative to the adapter unit under these conditions, the forces represented by the vectors $f2$ and acting on the set screws 100' and their associated balls 102 must be opposed by forces whose vectors $f3$ are identical with the vectors $f2$ but opposed to the latter (Fig. 3). In this instance also, the forces, represented by the vectors $f3$, with which the set screws 100' and their associated balls 102 are wedged against each other are considerably larger than the turning forces of the chuck unit as represented by the vectors $f1$, due to the preferential arrangement of these set screws so that they do not deviate overly much from radial disposition with respect to the chuck axis $x$—$x$.

Despite the described non-radial disposition of the set screws 100 with respect to the chuck axis $x$—$x$ (Fig. 3), they are preferably further disposed so that they lie with their axes in a common plane normal to the chuck axis $x$—$x$ (Fig. 2). In doing so, there is no likelihood that the set screws 100 will, on their rotation for an adjustment of the chuck unit U on the adapter unit 18, cant the chuck unit in any way so as to become bound on the adapter unit, and the chuck unit will, instead, respond in its adjustment to rotation of these set screws in optimum fashion. It is also preferable to arrange all set screws 100 so that their axes pass the chuck axis $x$—$x$ at equal distances therefrom (Fig. 3), with the result that the wedging forces between these set screws and their associated balls 102 are advantageously alike.

In the description so far of the exemplary chuck of Figs. 1 to 3 the axial disposition of the set screws 100 has been defined with reference to the chuck axis $x$—$x$ insofar as their deviation from axial disposition with respect to the latter is concerned (Fig. 3), and such reference to the chuck axis $x$—$x$ is generally accurate due to the substantial coincidence, or near coincidence in any event, of the center axes of the chuck and adapter units in view of the limited adjustability of the chuck unit on the adapter unit of the instant exemplary chuck. However, it is more accurate, and in the case of wider adjustability of the chuck unit on the adapter unit, even imperative, to relate the axial disposition of the set screws to the longitudinal or center axis of the unit which does not carry the set screws. Thus, since the set screws 100 in the instant exemplary chuck 10 are carried by the chuck unit U, they are arranged so that their axes pass the longitudinal or center axis of the adapter unit 18 on different sides thereof in any adjusted position of the chuck unit on the latter, in order that none of these set screws may conceivably assume a radial disposition with respect to the center axis of the adapter unit and, in consequence, fail to perform its designated locking or wedging function on relative rotational tendencies between the units. Conversely, if the adapter unit 18 would carry the set screws 100 and the chuck unit U would carry the balls 102 in a form of chuck which is fully within the purview of the present invention, the set screws would be arranged so that their axes pass the longitudinal or center axis of the chuck unit on different sides thereof in any adjusted position of the latter on the adapter unit.

While all of the set screws of the exemplary chuck of Figs. 1 to 3 are arranged to have wedge-like cooperation with their associated balls on relative rotational tendencies between the chuck and adapter units, fewer set screws may be arranged in this fashion if this is desirable or feasible. Thus, the chuck 10' in Fig. 4, employing four set screws 100a, the same as the chuck 10 (Fig. 3), differs from the latter in that a minimum number of set screws, namely, two, for locking either unit to the other unit against relative rotation in opposite directions, are arranged to have wedge-like cooperation with their associated balls 102a on relative rotational tendencies between the units. Thus, the set screws 100a', carried again by way of example in the chuck unit U', may be disposed radially of the center axis $x'$ of the latter, so that they will not cooperate in effective wedge-like fashion with their associated balls 102a to oppose powerful relative rotational tendencies between the units, even if the chuck unit U' were adjusted on the adapter unit 18' so that their respective longitudinal or center axes were laterally spaced from each other at the permissible maximum. However, the remaining set screws 100a are disposed so that their axes pass the longitudinal or center axis of the adapter unit 18' sidewise thereof, preferably at equal distances therefrom. More particularly, the set screw 100a'' is so arranged that it will wedge with its associated ball 102a and lock both units U' and 18'' to each other on counterclockwise rotational tendencies of the chuck unit relative to the adapter unit, or on clockwise rotational tendencies of the adapter unit relative to the chuck unit. Conversely, the set screw 100a''' is so arranged that it will wedge with its associated ball 102a and lock both units U' and 18' to each other on clockwise rotational tendencies of the chuck unit relative to the adapter unit or on counterclockwise rotational tendencies of the adapter unit relative to the chuck unit.

The described set screw arrangement in the chuck 10' of Fig. 4 is entirely feasible where a single set screw and its associated ball are adequate safely to counteract the maximum possible or expected rotational tendencies of one unit relative to the other unit in one direction or rotational tendencies of like magnitude of the other unit relative to the one unit in the opposite direction. Also, while the set screws 100a'' and 100a''' with their wedge-like reaction with the adjacent balls 102a on relative rotational tendencies between the units are shown in Fig. 4 in substantially diametrically opposed disposition, they may obviously be arranged next to each other without affecting their described functioning in any way. It is also fully within the purview of the present invention to have only one or more of the set screws of the chuck arranged to cooperate with their associated balls in wedge-like fashion in order to lock the units against relative rotation on rotational tendencies of one unit in one direction relative to the other unit or on rotational tendencies of the other unit in the opposite direction relative to the one unit. Thus, if the chuck 10' in Fig. 4, for instance, is in its usual application subjected only to clockwise rotational tendencies of its chuck unit U' relative to its adapter unit 18', the single set screw 100a''' may serve to cooperate wedge-like with its associated ball 102a and lock the units to each other against relative rotation under these circumstances, while the remaining set screws may be arranged radially of the longitudinal or center axis $x'$ of the chuck unit U'.

While in the forms of the chuck described so far and shown in Figs. 1 to 3 and Fig. 4, respectively, the set screws cooperate with balls, or equivalent rollers, the set screws may also cooperate directly with the unit which does not carry them, as demonstrated by an exemplary chuck 120 in Fig. 5. This chuck 120 may in all respects be like the described chuck 10 (Fig. 3), except that the set screws 122 in the chuck unit 124 cooperate directly with peripheral portions 126 of the adapter unit 128. In the present example, all of the set screws 122 are arranged so that their axes pass the longitudinal or center axis $x''$ of the adapter unit 128 on different sides thereof, with the result that all set screws react wedge-like with the adjacent peripheral portions 126 of the adapter unit 128 and lock both units 124 and 128 to each other against relative rotation on relative rotational tendencies between the units. Thus, the set screws 122' cooperate wedge-like with the adjacent peripheral portions 126 of the adapted unit to lock both units against relative rotation on counterclockwise rotational tendencies of the chuck unit 124 relative to the adapter unit 128 or on clockwise rotational tendencies of the adapter unit relative to the chuck unit. Conversely, the set screws 122'' cooperate wedge-like with the adjacent peripheral portions 126 of the adapter unit to lock both units against relative rotation on clockwise rotational tendencies of the chuck unit 124 relative to the adapter unit 128 or on counterclockwise rotational tendencies of the adapter unit relative to the chuck unit.

In accordance with a further aspect of the present invention, the force with which the chuck unit U and adapter unit 18 (Fig. 2) are axially clamped to each other may automatically be controlled to the end that this clamping force is considerably reduced in magnitude for adjustment of the chuck unit on the adapter unit and is restored to its full magnitude after such adjustment is concluded, all in response to manipulation of the set screws and without in any way manipulating the holding screws 64. To this end, the set screws 100, which for the achievement of the described interlock of the chuck and adapter units on relative rotational tendencies between these units, extend with their axes on different sides of the longitudinal or center axis of the adapter unit in any adjusted position of the chuck unit on the latter as shown in Fig. 3, are further disposed so that their axes are also inclined to the longitudinal or center axis of the chuck unit U as shown in Fig. 6. The axial disposition of each set screw 100 relative to the longitudinal or center axes of both units is illustrated diagrammatically in Fig. 6A and 6B, in which these axes are designated by the reference numeral $x'''$ and for the sake of simplicity shown coincident with each other, although these parallel axes may laterally be spaced from each other as earlier explained. Thus, Fig. 6A shows a set screw 100 vertically beneath the axis $x'''$, as seen from the side in Fig. 6B, and the perspective illustration of this set screw in Fig. 6A indicates the inclined disposition of the latter as also shown in Figs. 6 and 6B. The further disposition of this set screw 100 so that its axis X passes the axis $x'''$ on one side thereof is diagrammatically illustrated in Fig. 6A. Hence, while the axis X of the set screw does not pass through the axis $x'''$ and, hence, does not form an angle with the latter, a plane P in which the screw axis X lies and which extends transversely of the axis $x'''$, forms with the latter an acute angle A as shown in Fig. 6B, the plane P being in this figure viewed edgewise and, hence, represented by a single dot-and-dash line which is coincident with the screw axis X. In thus arranging the set screw 100 to bring about the explained angle formation A (Fig. 6B), the same will on its inward drive exert on the adapter unit 18 and chuck unit U reactive forces R and R' (Fig. 6) which have reactive components F1 and F2 whose opposed vectors extend in planes normal to the unit axes and, hence, constitute forces, called "adjustment" forces, which cooperate to cause movement of the chuck unit on the adapter unit for adjustment of the former on the latter, and further reactive components F3 and F4 whose opposed vectors extend parallel to the unit axes and, hence, constitute forces, called "binding" forces, which cooperate to clamp the chuck unit to the adapter unit through intermediation of the holding screws 64.

Since in the preferred use of the chuck the units U and 18 remain clamped together with some force by the holding screws 64 even when any or all set screws 100 should be loosened for an adjustment of the chuck unit, it being contemplated ordinarily not to loosen the holding screws 64 for this purpose, the inclination of all set screws 100, or of any lesser number thereof, if desired, to the unit axes (Fig. 6) must under the circumstances be such that the aforementioned adjustment forces F1 and F2 are greater than the frictional resistance encountered by the chuck unit and adapter unit on each other by virtue of the clamping forces exerted on the same by the holding screws 64 and the aforementioned additive binding forces F3 and F4, as otherwise the chuck unit would bind on the adapter unit on manipulation of the loosened set screws for an intended adjustment of the chuck unit. This is readily accomplished by arranging the axis-inclined set screws 100 (Fig. 6) so that their above-described angle formation A (Fig. 6B) are more than 45 degrees, and preferably considerably more than 45 degrees.

Those set screws, either all of them or a lesser number, as desired, which on tightening are to augment the axial clamping force exerted by the holding screws 64 on the units U and 18, are preferably identically inclined to the unit axes (Fig. 6) so that, with the holding screws 64 tightened to clamp the chuck unit to the adapter unit with reasonable firmness, the loosened set screws will on manipulation shift the chuck unit on the adapter unit without undue effort despite the ever-present binding forces F3 and F4 which, however, are of small magnitude while adjustment of the chuck unit by some of the set screws takes place and is not opposed by the other set screws. However, as further adjustment of the chuck unit on the adapter unit is being opposed by any of the set screws on manipulation of another set screw or screws, as may occur in step-by-step inching of the chuck unit toward its new position on the adapter unit and will in any event occur on concluding the adjustment of the former and tightening all set screws, the aforementioned binding forces F3 and F4 will increase rapidly and sufficiently augment the clamping force exerted by the holding screws 64 on the units U and 18 to transmit most, if not all, operational stresses, save substantial torsional stresses, from the chuck unit directly to the adapter unit rather than by way of the balls 102 and set screws 100.

The inclination of the set screws to the chuck axis for the purpose of augmenting the axial clamping force exerted by the holding screws on the chuck and adapter units of a chuck of this general type is shown and described in a copending application of Edward A. Galler, Serial No. 618,167, filed June 27, 1955. However, the instant set screws 100 which are inclined to the chuck axis (Fig. 6) are further disposed so that their axes pass the respective unit axis on the side thereof (Fig. 3). Hence, the instant axis-inclined and axis-passing set screws 100 (Figs. 3 and 6) have not only the same function as those of Galler, to wit, to augment the axial clamping force exerted by the holding screws on the chuck and adapter units, but have the additional function, foreign to Galler's set screws, of locking the chuck and adapter units to each other against relative rotation on relative rotational tendencies between these units.

While the axis-inclined and axis-passing set screws have in Fig. 6 been demonstrated on a chuck having the advantageous ball links 102 between the set screws in one unit and the other unit, it is fully within the purview of the present invention to apply these same set screws to any other conventional universal chuck of the center-adjustable type. Thus, Fig. 7 shows a chuck 140 the adapter unit 142 of which is devoid of ball links, and instead is provided with a frusto-conical formation 144 with which the axis-inclined and axis-passing set screws 146 in the chuck unit 148 cooperate.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

What is claimed is:

1. In a universal chuck of the adjustable type having a chuck unit with a longitudinal axis and an adapter unit having provisions for its attachment to a support and carrying said chuck unit for limited relative sliding movement thereon in any direction in a plane normal to said axis, the combination of surfaces on one of said units angularly spaced and extending circularly about a common axis parallel to said unit axis; and a plurality of set screws in the other unit turnable to cooperate with said surfaces, respectively, for adjusting said chuck unit on said adapter unit, at least one of said set screws being disposed with its axis passing said common axis on one side thereof in any adjusted position of said chuck unit on said adapter unit, so that said one set screw and cooperating surface act wedge-like to lock said units against relative rotation on rotational tendencies of either unit in one direction relative to the other unit.

2. The combination in a universal chuck of the adjustable type as set forth in claim 1, in which at least another of said set screws is disposed with its axis passing said common axis on a side thereof in any adjusted position of said chuck unit on said adapter unit, so that said other set screw and cooperating surface act wedge-like to lock said units against relative rotation on rotational tendencies of either unit relative to the other unit in a direction opposite to said one direction.

3. In a universal chuck of the center-adjustable type having a chuck unit with a longitudinal center axis and an adapter unit having provisions for its attachment to a support and carrying said chuck unit for limited relative sliding movement thereon in any direction in a plane normal to said axis, the combination of surfaces on one of said units angularly spaced and extending circularly about a common axis parallel to said unit axis; and a plurality of set screws in the other unit turnable to cooperate with said surfaces, respectively, for adjusting said chuck unit on said adapter unit, said set screws being disposed with their axes lying in a common plane normal to either axis, and at least one of said set screws being disposed with its axis passing said common axis on one side thereof in any adjusted position of said chuck unit on said adapter unit, so that said one set screw and cooperating surface act wedge-like to lock said units against relative rotation on rotational tendencies of either unit in one direction relative to the other unit.

4. The combination in a universal chuck of the center-adjustable type as set forth in claim 3, in which at least another of said set screws is disposed with its axis passing said common axis on a side thereof in any adjusted position of said chuck unit on said adapter unit, so that said other set screw and cooperating surface act wedge-like to lock said units against relative rotation on rotational tendencies of either unit relative to the other unit in a direction opposite to said one direction.

5. In a universal chuck of the center-adjustable type having a chuck unit with a longitudinal center axis and an adapter unit having provisions for its attachment to a support and carrying said chuck unit for limited relative sliding movement thereon in any direction in a plane normal to said axis, the combination of frusto-conical surface parts on one of said units angularly spaced and extending circularly about a common axis parallel to said unit axis; and a plurality of set screws in the other unit turnable to cooperate with said surface parts, respectively, for adjusting said chuck unit on said adapter unit, at least one of said set screws being disposed so that its axis not only passes said common axis on one side thereof in any adjusted position of said chuck unit on said adapter unit, but also lies in a plane which extends transversely of and inclined to said unit axis and forms with the latter an acute angle pointing opposite to the axial direction in which said frusto-conical surface parts decrease in diameter, whereby said one set screw and cooperating surface part act wedge-like to lock said units against relative rotation on rotational tendencies of either unit in one direction relative to the other unit, and also axially to clamp said units together, respectively.

6. The combination in a universal chuck of the center-adjustable type as set forth in claim 5, in which at least another of said set screws is disposed with its axis passing said common axis on a side thereof in any adjusted position of said chuck unit on said adapter unit, so that said other set screw and cooperating surface part act wedge-like to lock said units against relative rotation on rotational tendencies of either unit relative to the other unit in a direction opposite to said one direction.

7. In a universal chuck of the adjustable type having a chuck unit with a first longitudinal center axis and an adapter unit with a longitudinal center axis parallel to said first axis and having provisions for its attachment to a support and carrying said chuck unit for limited relative sliding movement thereon in any direction in a plane normal to said axes, the combination of a plurality of sockets in one unit angularly spaced about the center axis of the latter, balls seated and turnable in said sockets, respectively, and set screws in the other unit engaging with their end surfaces said balls, respectively, and being turnable for adjusting said chuck unit on said adapter unit, each of said balls having a flat and said end surfaces of said set screws being flat and engaging the flats on the respective balls, and at least one of said set screws being disposed with its axis passing said center axis of said one unit on one side thereof in any adjusted position of said chuck unit on said adapter unit, so that said one set screw and ball engaged thereby act wedge-like to lock said units against relative rotation on rotational tendencies of either unit in one direction relative to the other unit.

8. The combination in a universal chuck of the adjustable type as set forth in claim 7, in which at least another of said set screws is disposed with its axis passing said center axis of said one unit on a side thereof in any adjusted position of said chuck unit on said adapter unit, so that said other set screw and ball engaged thereby act wedge-like to lock said units against relative rotation on rotational tendencies of either unit relative to the other unit in a direction opposite to said one direction.

9. The combination in a universal chuck of the adjustable type as set forth in claim 7, in which said one set screw is so disposed that its axis also lies in a plane which extends transversely of and inclined to either center axis and forms therewith an acute angle, whereby said one set screw and ball engaged thereby also act axially to clamp said units together.

References Cited in the file of this patent
UNITED STATES PATENTS

| | | |
|---|---|---|
| 2,524,468 | Ouimette | Oct. 3, 1950 |
| 2,639,157 | Buck et al. | May 19, 1953 |
| 2,780,468 | Dunbar | Feb. 5, 1957 |
| 2,785,902 | Zajdel | Mar. 19, 1957 |